US010576381B2

(12) United States Patent
Lee

(10) Patent No.: US 10,576,381 B2
(45) Date of Patent: Mar. 3, 2020

(54) METHOD FOR PERFORMING GAME BY USING ACTIVITY COUNT

(71) Applicant: Hoon Shung Lee, Seoul (KR)

(72) Inventor: Hoon Shung Lee, Seoul (KR)

( * ) Notice: Subject to any disclaimer, the term of this patent is extended or adjusted under 35 U.S.C. 154(b) by 0 days.

(21) Appl. No.: 15/825,397

(22) Filed: Nov. 29, 2017

(65) Prior Publication Data

US 2018/0078860 A1 Mar. 22, 2018

Related U.S. Application Data

(63) Continuation of application No. PCT/KR2016/005070, filed on May 13, 2016.

(30) Foreign Application Priority Data

Jun. 5, 2015 (KR) .................. 10-2015-0079735

(51) Int. Cl.
| A63F 13/798 | (2014.01) |
| A63F 13/335 | (2014.01) |
| A63F 13/61  | (2014.01) |
| A63F 13/46  | (2014.01) |
| A63F 13/30  | (2014.01) |

(52) U.S. Cl.
CPC .......... *A63F 13/798* (2014.09); *A63F 13/335* (2014.09); *A63F 13/46* (2014.09); *A63F 13/61* (2014.09); *A63F 13/30* (2014.09); *A63F 2300/5506* (2013.01); *A63F 2300/558* (2013.01); *A63F 2300/61* (2013.01)

(58) Field of Classification Search
CPC ........ A63F 13/30; A63F 13/335; A63F 13/46; A63F 13/61
See application file for complete search history.

(56) References Cited

U.S. PATENT DOCUMENTS

| 7,402,105 B1 * | 7/2008 | Hutter | ............... A63F 13/12 |
| | | | 463/42 |
| 8,998,722 B2 * | 4/2015 | Lee | ............... A63F 13/352 |
| | | | 463/40 |

(Continued)

FOREIGN PATENT DOCUMENTS

| KR | 10-2001-0111674 A | 12/2001 |
| KR | 10-0505092 B1 | 7/2005 |
| KR | 10-2013-0013212 A | 2/2013 |

OTHER PUBLICATIONS

International Search Report issued in PCT/KR2016/005070; dated Aug. 24, 2016.

(Continued)

*Primary Examiner* — Chase E Leichliter
(74) *Attorney, Agent, or Firm* — Studebaker & Brackett PC

(57) ABSTRACT

Disclosed is a method for performing a game by using an activity count. The method includes receiving a specific internet identifier that is input by a user, from a client (S100), acquiring an activity count of contents corresponding to the internet identifier (S200), converting the activity count to a game point in a specific game (S300), and allocating a specific game point to an account of the user according to an allocation weight condition in unit of a specific time (S400). Accordingly, because the monetary value of the activity count in the reality may be applied to the game point of the online game, a realistic game may be realized as the reality may be linked to the game.

15 Claims, 3 Drawing Sheets

(56) References Cited

U.S. PATENT DOCUMENTS

| | | | | |
|---|---|---|---|---|
| 2001/0024974 A1* | 9/2001 | Cohen | G09B 19/0053 | 463/42 |
| 2006/0094499 A1* | 5/2006 | Amemiya | A63F 13/12 | 463/29 |
| 2007/0129126 A1* | 6/2007 | Van Luchene | A63F 13/12 | 463/1 |
| 2007/0226062 A1* | 9/2007 | Hughes | G06Q 30/02 | 705/14.14 |
| 2009/0036216 A1* | 2/2009 | Ratcliff | A63F 13/12 | 463/42 |
| 2009/0132656 A1* | 5/2009 | Ganz | G06Q 10/10 | 709/205 |
| 2009/0181774 A1* | 7/2009 | Ratcliff | A63F 13/12 | 463/42 |
| 2014/0101239 A1* | 4/2014 | Esposito | H04L 67/1091 | 709/203 |
| 2014/0289828 A1* | 9/2014 | Gross | A63F 13/12 | 726/6 |
| 2014/0370975 A1* | 12/2014 | Coronel | A63F 13/69 | 463/25 |
| 2015/0057072 A1* | 2/2015 | Youda | A63F 13/46 | 463/25 |
| 2015/0350292 A1* | 12/2015 | Maman | H04L 67/02 | 709/219 |
| 2015/0375119 A1* | 12/2015 | Musuluri | G06F 16/951 | 463/23 |

OTHER PUBLICATIONS

An Office Action; "Notice of Allowance," issued by the Korean Intellectual Property Office dated Jun. 16, 2016, which corresponds to Korean Patent Application No. 10-2015-0079735.

* cited by examiner

METHOD FOR PERFORMING GAME BY USING ACTIVITY COUNT

CROSS-REFERENCE TO RELATED APPLICATIONS

The present application is a continuation of International Patent Application No. PCT/KR2016/005070, filed on May 13, 2016, which is based upon and claims the benefit of priority to Korean Patent Application No. 10-2015-0079735, filed on Jun. 5, 2015. The disclosures of the above-listed applications are hereby incorporated by reference herein in their entirety.

BACKGROUND

Embodiments of the inventive concept described herein relate to a method for performing a game by using an activity count, and more particularly, to a method for acquiring a game point that is utilized in a game.

For a game, a game point for purchasing and upgrading items that is necessary to perform the game is necessary. A game point is generally acquired in a process of performing a game. That is, a game point is acquired by manipulating a unit in a game to acquire an article corresponding to the game point or wining a battle through a character in the game.

In a method other than the method of acquiring a game point through performance of a game, a game point is purchased by using real cash.

SUMMARY

Embodiments of the inventive concept provide a method for performing a game by using an activity count, in which an activity count of online contents acquired through an internet identifier of the contents so that a sense of reality and a monetary value may be provided by applying a value of an activity count in the reality to a game point and an interest may be provided to a user even in a process of acquiring the game point.

In accordance with an aspect of the inventive concept, there is provided a method for performing a game by using an activity count, the method including receiving a specific internet identifier that is input by a user, from a client, acquiring an activity count of contents corresponding to the internet identifier, converting the activity count to a game point in a specific game, and allocating a specific game point to an account of the user according to an allocation weight condition in unit of a specific time.

The receiving of the specific internet identifier may include receiving a request for acquisition of the game point from the client, activating a web surfing function of the client in the game, and receiving specific internet identifier selection data from the client, and the internet identifier selection data may be a specific internet identifier that is selected by the user from a webpage provided through the web surfing in the game.

In accordance with an aspect of the inventive concept, there is provided a method for performing a game by using an activity count, the method including receiving a request for recommendation of an internet identifier from a client, searching for and acquiring an internet identifier of contents that possess an activity count, providing one or more internet identifiers corresponding to a condition of a character possessed by a user, selecting a specific internet identifier of the user by the client, acquiring an activity count of contents corresponding to the selected internet identifier, converting the activity count to a game point in a specific game, and allocating a specific game point to an account of the user according to an allocation weight condition in unit of a specific time.

The providing of the one or more internet identifiers may include classifying the acquired internet identifiers according to a specific classification reference, calculating an available range of the classification based on a level of the character or a possessed item, and providing one or more internet identifiers in the calculated range to the client, and the classification reference may include at least one of a current activity count, an increase rate of an activity count, a site type including the internet identifier, and characteristics of contents corresponding to the internet identifier.

A value or a ratio of the game point that may be acquired from one internet identifier according to a level or an item of the character possessed by the user may be restricted.

The converting of the activity count may include periodically identifying the activity count of the contents in the internet identifier and reflecting the identified activity count on the converting game point.

The converting of the activity count may include searching for a conversion reference corresponding to a site of the internet identifier, and converting the activity count to the game point according to the found conversion reference, and the conversion reference may include advertise costs of the site.

The allocation weight condition may be at least one of a level of the character possessed by the user, a possessed item, characteristics of the character, and the number of the characters.

The method may further include calculating an available residual value of the game point corresponding to the internet identifier and providing the calculated residual value to the client.

The method may further include generating a website in which the contents corresponding to the acquired internet identifier is disposed at a specific location according to a rank of the activity count.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
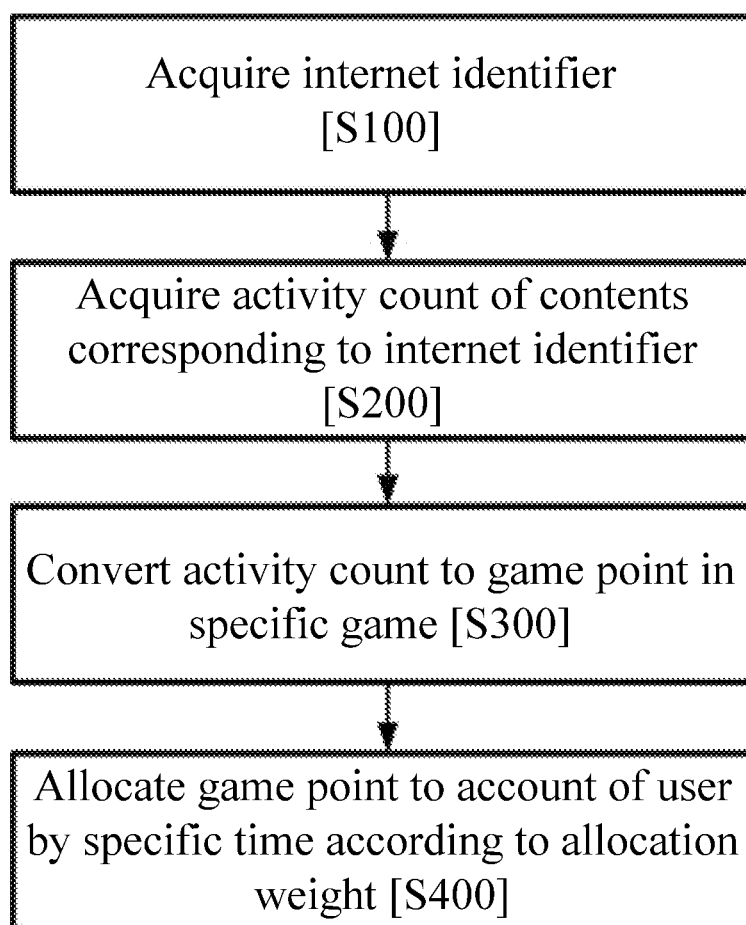
FIG. 1 is a flowchart of a method for performing a game by using an activity count according to an embodiment of the inventive concept.

Hereinafter, exemplary embodiments of the inventive concept will be described in detail with reference to the accompanying drawings. The above and other aspects, features and advantages of the inventive concept will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

In the specification, a client includes all various devices that may provide a user with a result by performing a calculation. For example, the client may correspond to a smartphone, a tablet PC, a cellular phone, a personal communication service (PCS) phone, a mobile terminal of a synchronous/asynchronous international mobile telecommunication (IMT)-2000, a palm personal computer (PC), and a personal digital assistant (PDA), in addition to a desktop computer and a notebook.

In the specification, an activity count is a value that represents online activities of users. In particular, an activity count may refer to the accumulated number of activities of users for specific online contents. For example, when the contents correspond to a video (for example, a video on YouTube) disclosed on the online, the activity count may refer to the number (that is, the number of real-time hits) of the users who identified the corresponding contents on the online. Further, when the contents correspond to a text, an image or a video disclosed in a social network service (SNS), the number (for example, the number of "Goods" on Facebook, the number of comments, or the like) of the users who read the contents or the number of reactions of the users may correspond to an activity count. Further, the activity count may correspond to the number of visits or messages of bulletin board of a specific site (for example, a homepage, a blog, or an SNS page of a specific user).

In the specification, an internet identifier (uniform resource identifier (URI)) refers to data that is used to identify a text, a video, a sound, a still or animation image and the like that are serviced in the internet. For example, the internet identifier may correspond to a webpage address (uniform resource locator (URL)) that provides online contents, such as a specific image.

In the specification, contents correspond to a specific identifier on the online and have an activity count. That is, the contents may include a website that has data such as the number of visits, in addition to a video, an image, and a message on bulletin board that have an activity count.

Figure 2:
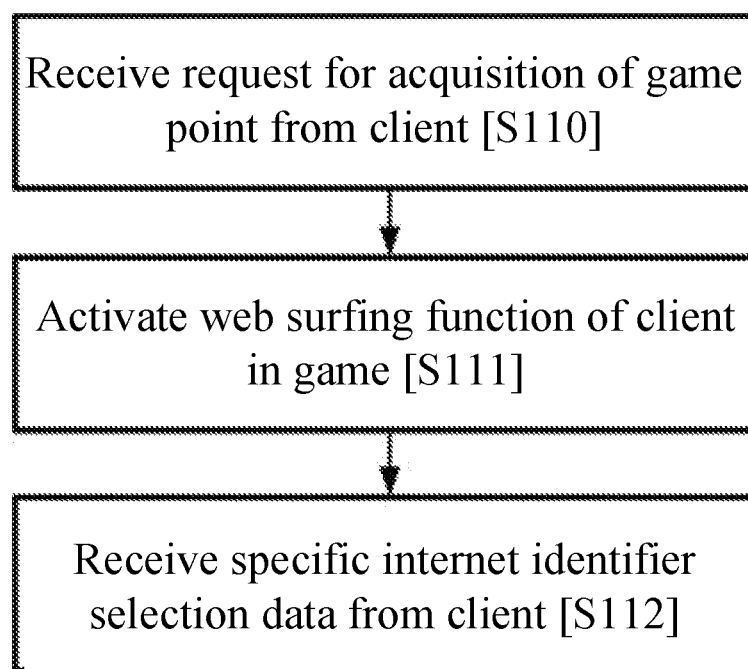
FIG. 2 is a flowchart of a process of selecting an internet identifier, from which an activity count is to be extracted, through web surfing in a game according to an embodiment of the inventive concept.
Figure 3:
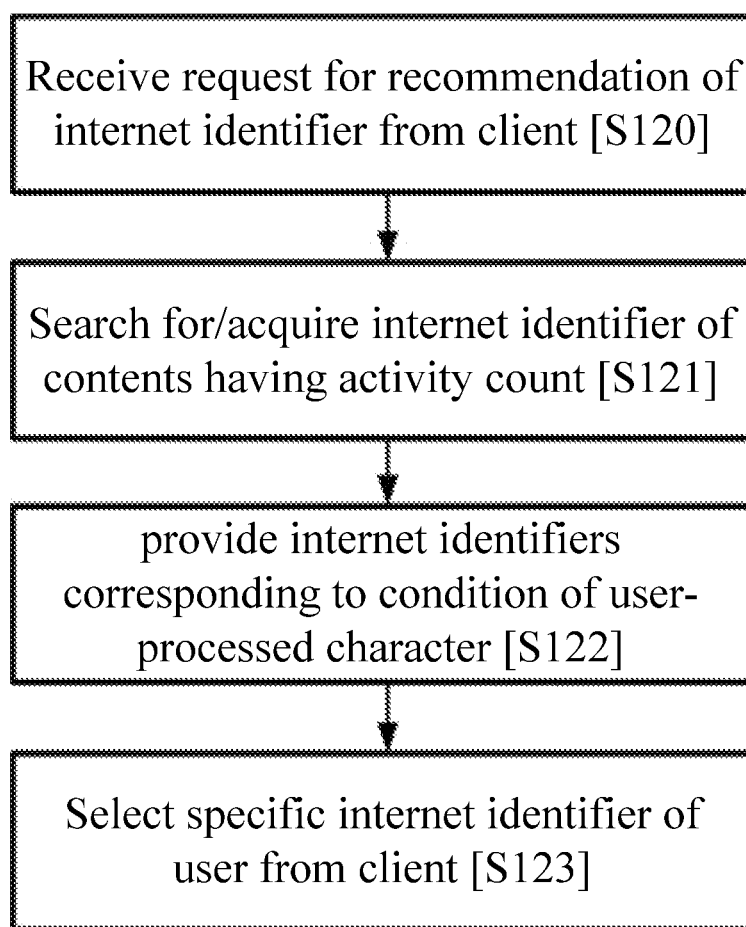
FIG. 3 is a flowchart of a process of acquiring an internet identifier, from which an activity count is to be extracted, through search of an internet identifier by a server, according to an embodiment of the inventive concept.

FIG. 1 is a flowchart of a method for performing a game by using an activity count according to an embodiment of the inventive concept. FIG. 2 is a flowchart of a process of selecting an internet identifier, from which an activity count is to be extracted, through web surfing in a game according to an embodiment of the inventive concept. FIG. 3 is a flowchart of a process of acquiring an internet identifier, from which an activity count is to be extracted, through search of an internet identifier by a server, according to an embodiment of the inventive concept.

Hereinafter, a method for performing a game by using an activity count according to various embodiments of the inventive concept will be described with reference to the accompanying drawings.

FIG. 1 is a flowchart of a method for performing a game by using an activity count according to an embodiment of the inventive concept.

Referring to FIG. 1, a method for performing a game by using an activity count according to an embodiment of the inventive concept includes an operation (S100) of acquiring an internet identifier; an operation (S200) of acquiring an activity count of contents corresponding to the internet identifier; an operation (S300) of converting the activity count to a game point in a specific game; and an operation (S400) of allocating a specific game point to an account of a user in unit of a specific time according to an allocation weight condition. The method for performing a game by using an activity count according to an embodiment of the inventive concept will be described according to its sequence.

A server acquires an internet identifier (S100). The server may acquire an internet identifier in various schemes.

The server may receive a specific internet identifier that is input by a user, from a client. For example, the client may provide an input window through which the user may input an internet identifier in a game so that the user may directly input an internet identifier or copy an internet identifier from a web browser and paste the copied internet identifier. The server may receive the input internet identifier from the client.

Further, a scheme of providing a page in which the client may perform web surfing in a game, and selecting a specific link by the user may be applied. That is, as illustrated in FIG. 2, the operation of receiving the internet identifier may include an operation (S110) of receiving a request for acquisition of the game point from the client, an operation (S111) of activating a web surfing function of the client in the game, and an operation (S112) of receiving specific internet identifier selection data from the client.

First, the server receives a request or acquisition of a game point from the client (S110). The request for acquisition of a game point corresponds to a request for execution of an operation of acquiring a game point in the game from the server. For example, performance of a process of acquiring a game point may be requested from the server, by selecting a specific button on a game interface displayed on a client screen or inputting a specific command (for example, inputting an instruction that executes a process of acquiring a game point) by the user.

Thereafter, the server may activate a web surfing function of the client that transmitted a request for acquisition of a game point in a game (S111). That is, the user may be provided with a webpage through which web surfing may be performed in the executed game. The server may directly provide a web surfing function or allow the web surfing function to be linked to a specific web browser to be performed in a game application or a program.

Thereafter, the server receives specific internet identifier selection data from the client (S112). That is, the user may select a specific internet identifier in a process of performing web surfing in the webpage in the game. The client may transmit the internet identifier selected by the user, to the server. The internet identifier selection data may be a specific internet identifier that is selected by the user from the webpage provided through web surfing in the game. For example, the user may select an internet identifier selection button disposed at a periphery of an address input window on the client screen, or may select the internet identifier through a specific manipulation of a hyperlink on the webpage (for example, a manipulation of long-touching a hyperlink when the client is a device including a touchscreen).

Further, the server may acquire the internet identifier by directly performing a process of searching for an internet identifier. For example, the server may acquire the internet identifier by crawling contents possessing an activity count.

According to another aspect of an embodiment, as illustrated in FIG. 3, the method may include an operation (S120) of request for recommendation of an internet identifier from a client, an operation (S121) of searching for and acquiring an internet identifier of contents possessing an activity count, an operation (S122) of providing one or more internet identifiers corresponding to a condition of a character possessed by the user, and an operation (S123) of selecting a specific internet identifier of the user by the client.

First, the server may receive a request for recommendation of an internet identifier from the client (S120). The request for recommendation of the internet identifier corresponds to a request for search of an identifier that may acquire a game point in a game from the server. For example, performance of a process of recommending (or searching for) an internet identifier may be requested from the server, by selecting a specific button on a game interface displayed on a client screen or inputting a specific command (for example, inputting an instruction that executes a process of recommending an internet identifier) by the user.

Thereafter, the server may search for an internet identifier of contents possessing an activity count to acquire the internet identifier (S121). The server may acquire an internet identifier of contents possessing a plurality of activity counts by applying a technology (that is, a crawling technology) of collecting a document distributed and stored in numerous computers. The server may acquire an internet identifier only in a specific website. (For example, the server may acquire an activity count of a video in the YouTube while taking only the YouTube as a search range).

Thereafter, the server may provide the one or more internet identifiers corresponding to the condition of the character possessed by the user (S122). That is, the server may not provide the acquired internet identifier to the users equally, but may provide the internet identifier differently according to a specific condition. For example, the server may differentially provide an internet identifier according to a level of a character of the user, an item possessed by the user, or the like. When the user possesses a character of a high level or an item of a high specification, the server may provide an internet identifier, of which an increase rate of the activity count or of which a conversion condition to a game point is high.

An another embodiment of the operation (S122) of providing the internet identifier may include an operation of classifying the plurality of internet identifiers acquired according to a specific classification reference, an operation of calculating a range of the classification that may be provided based on a level of the character or the possessed item, and an operation of providing one or more internet identifiers in the calculated range to the client.

First, the server may classify the plurality of internet identifiers acquired according to the specific classification reference. The classification reference may include a current activity count, an increase rate of an activity count, a site type including the internet identifier, and characteristics of contents corresponding to the internet identifier. Because the user may secure more game points as the internet identifier has a higher current activity count or a higher increase rate of the activity count, the current activity count or the increase rate of an activity count may be utilized as the classification reference. As will be described below, because the rate of conversion to a game point may be different according to the kind or type of the site, the kind or type of the site may be utilized as a classification reference. The server may comprehensively reflect the elements of the classification reference to classify the ranks of the plurality of internet identifiers.

Thereafter, the server may calculate a range of the classification that may be provided based on the level of the character or the possessed item. Thereafter, the server may provide one or more internet identifiers in the calculated range to the client. The server may provide an internet identifier in a range including a higher level of classification as the level of the character is higher or the specification of the possessed item is higher.

Thereafter, the client may select a specific internet identifier of the user and provide the selected internet identifier to the server (S123). That is, the user may select one or more internet identifiers provided from the server and displayed on the screen of the client.

The server acquires an activity count of the contents corresponding to the internet identifier (S200). The server extracts data corresponding to the activity count of the contents in the internet identifier selected or input by the user.

The server converts the extracted activity count to a game point in a specific game (S300). That is, the server may calculate a game point corresponding to the activity count in the contents in the specific internet identifier and may apply the calculated game point to the game.

In a process (S300) of converting the activity count to a game point, a specific conversion reference may be applied. That is, according to another aspect of an embodiment, the operation (S300) of converting the activity count may include an operation of searching for a conversion reference corresponding to a site of the internet identifier, and an operation of converting the activity count to a game point according to the found conversion reference. The conversion reference may be applied differently according to the site of the internet identifier. For example, because the average numbers of visits are different according to the sites, the same activity count may be differently applied for sites. Further, the contents of the sites may include advertisements together, and the advertisement costs may be different according to the sites. In order to reflect the value of the activity count in the reality, the advertisement costs of the site corresponding to the internet identifier may be applied. Further, when the advertisement costs are different according to the activity counts of the contents in a site, this may be reflected. Through this, because the monetary value of the activity count in the reality may be applied to the game point of the online game, a realistic game may be realized.

Further, according to another aspect of the operation (S300) of converting the activity count, the activity count of the contents in the internet identifier may be periodically identified and may be reflected on the converted game point. That is, because the activity count may continue to increase after the user acquires the internet identifier, the server may periodically access the internet identifier to acquire changed activity counts. Thereafter, the server may reflect the changed activity counts on the game point in real time to change all the game point values corresponding to the internet identifier.

The server allocates a specific game point to the account of the user according to an allocation weight condition in unit of a specific time (S400). The account of the user may correspond to a specific character, and may be one account including a plurality of characters. The allocation weight condition may be a condition for determining game points provided in unit of time, and may include a level of a character possessed by the user, a possessed item, characteristics of the character, and the number of characters. When a plurality of users input the same internet identifier, the server may differently apply the game points allocation according to the allocation weight condition for the users in unit of time.

For example, when the game is a massive multiplayer online role playing game (MMORPG), the game points allocated according to the levels of the characters of the user or the possessed items in unit of time may be differently applied. If the user includes an item, by which the user may acquire many game points per a specific time, the user may acquire the game point at a high allocation speed (or allocation weight) as compared with the other users in the same condition.

Further, for example, when various characters are present in the game, the allocation speeds (or allocation weights) of the game point may be different according to the characteristics of the character used by the user. For example, a specific character in a game has a high basic attack force while having a low allocation speed (or allocation weight) of a game point whereas another character has a high allocation speed (or allocation weight) of a game point while having a low basic attack force. So if a specific character has a high allocation speed (or allocation weight) of a game point and a low basic attack force, the attack force has to be supplemented by purchasing various items based on the acquired game point.

Further, for example, when the game is a game that utilizes a plurality of characters (units) for respective users, the game points acquired in unit of time may be different according to how many characters are allocated for acquisition of the game points.

Further, for example, when the user possesses a plurality of characters, game points may be secured by allocating the characters to different internet identifiers. Then, the allocation speeds (or allocation weights) at which game points are acquired from the internet identifiers may be different according to the conditions (for example, levels, attribute values, and possessed items) of the characters.

The server may allow the game point acquired through the internet identifier to be utilized for purchasing an item that increases allocation speed, and the users who do not have a large amount of game points yet but desire to purchase an item that increases allocation speed may purchase the item through payment to create profits.

Further, an another embodiment of the inventive concept may restrict a value or ratio of the game point that may be acquired from one internet identifier according to a level or an item of the character possessed by the user. That is, even though the activity count of the contents in the internet identifier is very large or continues to increase, purchase of items of the users or increase of the levels may be encouraged by restricting the value or ratio of the game point that may be acquired according to the level of the character or the possessed item.

Further, the server may further include an operation of calculating an available residual value of the game point corresponding to the internet identifier to provide the calculated residual value to the client. Although the user inputs an internet identifier based on an activity count of contents displayed on a website, the internet identifier of the contents may be already utilized by another user so that all the game points corresponding to the activity count may not be left. To achieve this, the server may inform the user of the residual amount of the game point corresponding to the input internet identifier. Further, the server also may inform the user that acquired the game point through a specific internet identifier of the residual amount of the game point that may be secured from the current corresponding identifier to inform the user that acquisition of an additional internet identifier is necessary.

Further, the server may further include an operation of generating a website in which the contents corresponding to the acquired internet identifier are disposed at a specific location according to the rank of the activity count. The server may generate a website that provides another person with contents of the internet identifier input by the user or directly acquired through search. Because the users input the internet identifiers of contents having high activity counts to acquire many game point and the contents having the high activity counts may be contents which many people are interested in, the server may generate a website that collects and provides contents of high popularity by using the acquired internet identifier. The server may determine a location of specific contents according to the rank of the activity count to generate a webpage.

The above-mentioned method for performing a game by using an activity count according to an embodiment of the inventive concept may be implemented with a program (or an application) to be combined with a computer which is hardware and be executed and may be stored in a medium.

For the computer to read the program and execute the methods implemented with the program, the above-mentioned program may include a code coded into a computer language such as C, C++, Java, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semipermanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the hardware or various storage media on the hardware of the user. The medium may be distributed to a computer system connected over a network and may store a computer-readable code on a distributed basis.

The inventive concept has the following effects.

First, because the monetary value in the reality of the activity count may be applied to the game point of the online game, a realistic game may be realized as compared with the conventional art as the reality and the game may be linked to each other.

Second, the users may feel fun in a process of acquiring a game point as well as in the game itself. That is, because a game is accompanied by a process of searching for an internet identifier of contents that may easily secure a game point, the user may feel fun additionally.

Third, a large amount of contents having a high popularity (that is, contents of a high view count) may be collected through an internet identifier that is input by the user to secure a game point. Accordingly, a service that provides the users with popular contents to the users may be provided by utilizing the collected contents.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A method for performing a game by using an activity count, the method comprising:
   receiving, by a server, from a client device, a specific internet identifier that is input by a user;
   acquiring, by the server, an activity count of a content corresponding to the internet identifier;
   converting, by the server, the activity count to a game point in a specific game;
   allocating, by the server, a specific game point to an account of the user according to an allocation weight condition in unit of a specific time,
   wherein at least one of a value and a ratio of the game point to be allocated to the account of the user based on the activity count is limited according to at least one of a level of a character possessed by the user and an item equipped by the character possessed by the user; and
   generating a website in which contents corresponding to acquired internet identifiers are disposed at specific locations according to ranks of the activity counts of the contents.

2. The method of claim 1, wherein the receiving of the specific internet identifier includes:
   receiving a request for acquisition of the game point from the client;
   activating a web surfing function of the client in the game; and
   receiving specific internet identifier selection data from the client, and
   wherein the internet identifier selection data is a specific internet identifier that is selected by the user from a webpage provided through the web surfing in the game.

3. The method of claim 1, wherein the converting of the activity count includes:
   identifying the activity count of the content in the internet identifier, and converting the identified activity count to the game point; and
   after a predetermined interval, identifying again, the activity count of the content in the internet identifier and updating the converted game point based on the identified activity count.

4. The method of claim 1, wherein the converting of the activity count includes:
   searching for a conversion reference corresponding to a site of the internet identifier; and
   converting the activity count to the game point according to the found conversion reference, and
   wherein the conversion reference includes advertise costs of the site.

5. The method of claim 1, wherein the allocation weight condition is at least one of the level of the character possessed by the user, the possessed item, characteristics of the character, and the number of the characters.

6. The method of claim 1, further comprising:
   calculating an available residual value of the game point corresponding to the internet identifier and providing the calculated residual value to the client.

7. The method of claim 1, further comprising
   executing the game, applying the allocated game point into the executed game, and providing the game to the user.

8. A method for performing a game by using an activity count, the method comprising:
   receiving, by a server, from a client device, a request for recommendation of an internet identifier;
   searching for and acquiring, by the server, an internet identifier of a content that possess an activity count;
   providing, by the server, one or more internet identifiers corresponding to a condition of a character possessed by a user;
   selecting, by the client device, a specific internet identifier of the user;
   acquiring, by the server, an activity count of the content corresponding to the selected internet identifier;
   converting, by the server, the activity count to a game point in a specific game;
   allocating, by the server, a specific game point to an account of the user according to an allocation weight condition in unit of a specific time; and
   generating a website in which contents corresponding to acquired internet identifiers are disposed at specific locations according to ranks of the activity counts of the contents.

9. The method of claim 8,
   wherein at least one of a value and a ratio of the game point to be allocated to the account of the user based on the activity count is limited according to at least one of a level of a character possessed by the user and an item equipped by the character possessed by the user.

10. The method of claim 8, wherein the providing of the one or more internet identifiers includes:
    classifying the acquired internet identifiers according to a specific classification reference;
    calculating an available range of the classification based on a level of the character or a possessed item; and
    providing one or more internet identifiers in the calculated range to the client, and
    wherein the classification reference includes at least one of a current activity count, an increase rate of an activity count, a site type including the internet identifier, and characteristics of the content corresponding to the internet identifier.

11. The method of claim 8, wherein the converting of the activity count includes:
identifying the activity count of the content in the internet identifier, and converting the identified activity count to the game point; and
after a predetermined interval, identifying again, the activity count of the content in the internet identifier and updating the converted game point based on the identified activity count.

12. The method of claim 8, wherein the converting of the activity count includes:
searching for a conversion reference corresponding to a site of the internet identifier; and
converting the activity count to the game point according to the found conversion reference, and
wherein the conversion reference includes advertise costs of the site.

13. The method of claim 8, wherein the allocation weight condition is at least one of the level of the character possessed by the user, the possessed item, characteristics of the character, and the number of the characters.

14. The method of claim 8, further comprising:
calculating an available residual value of the game point corresponding to the internet identifier and providing the calculated residual value to the client.

15. The method of claim 8, further comprising executing the game, applying the allocated game point into the executed game, and providing the game to the user.

* * * * *